D. LANGEVIN.
CLUTCH COLLAR.
APPLICATION FILED DEC. 18, 1909.
1,024,344.
Patented Apr. 23, 1912.
2 SHEETS—SHEET 1.
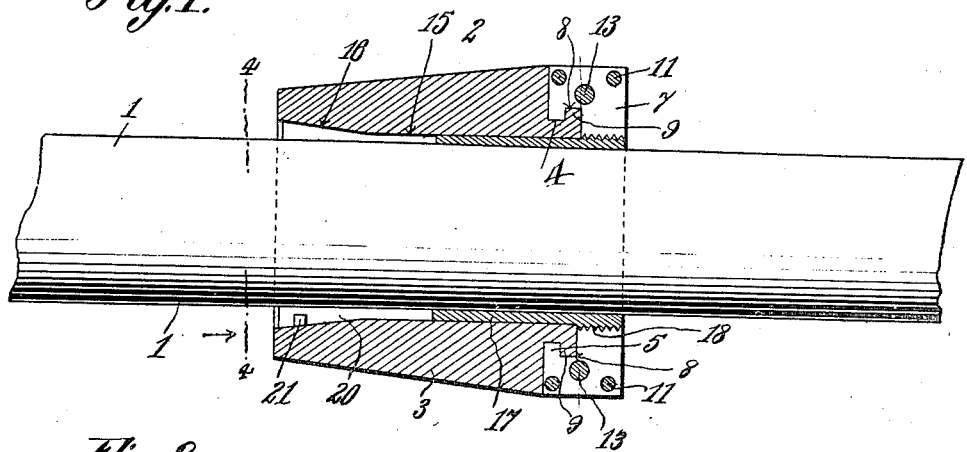
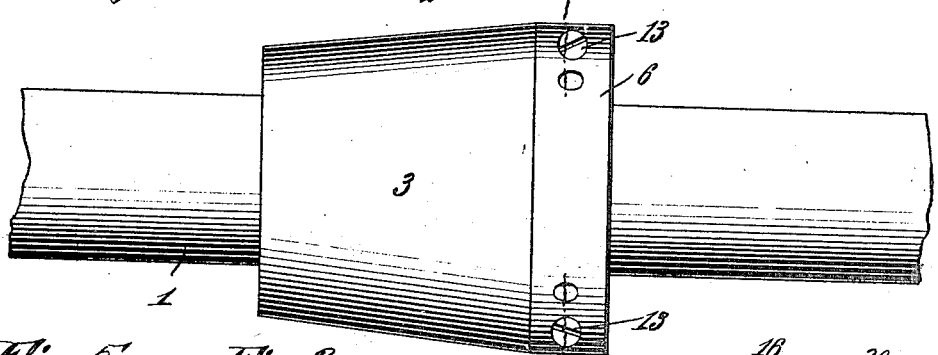
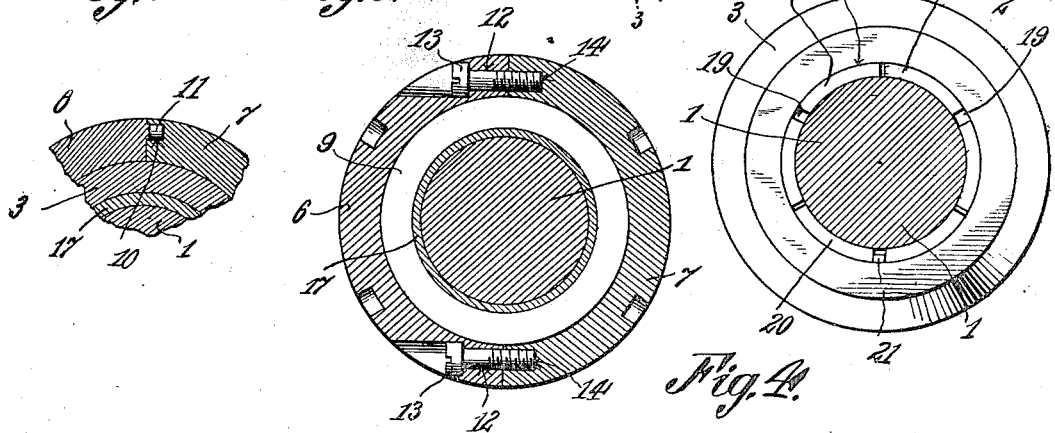
Inventor
Desire Langevin,
By Victor J. Evans
Attorney
Witnesses
J H Crawford

D. LANGEVIN.
CLUTCH COLLAR.
APPLICATION FILED DEC. 18, 1909.

1,024,344.

Patented Apr. 23, 1912.
2 SHEETS—SHEET 2.

Witnesses
J. H. Crawford
James A. Cord

Inventor
Desire Langevin,
By Victor J. Evans
Attorney

UNITED STATES PATENT OFFICE.

DESIRE LANGEVIN, OF RUMFORD, MAINE.

CLUTCH-COLLAR.

1,024,344.  Specification of Letters Patent.  Patented Apr. 23, 1912.

Application filed December 18, 1909. Serial No. 533,873.

*To all whom it may concern:*

Be it known that I, DESIRE LANGEVIN, a citizen of the United States of America, residing at Rumford, in the county of Oxford and State of Maine, have invented new and useful Improvements in Clutch-Collars, of which the following is a specification.

This invention relates to clutch collars, and has for an object to provide a device of this character that can be conveniently and effectively applied to a revoluble shaft without the provision of set screws or similar shaft-engaging devices.

Figure 6:
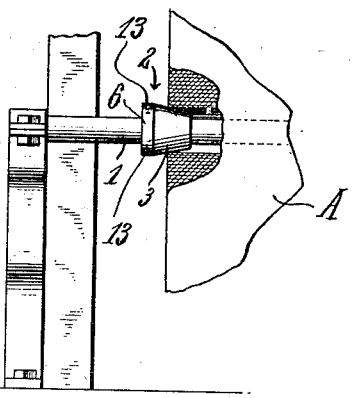
Figure 7:
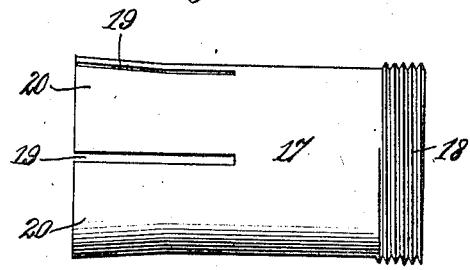
Figure 8:
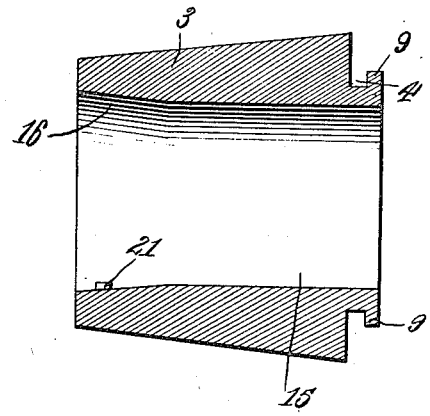
Figure 9:
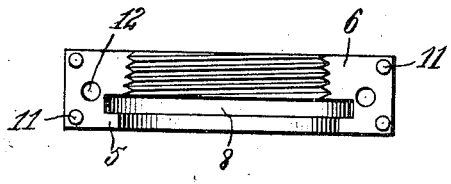
Figure 10:
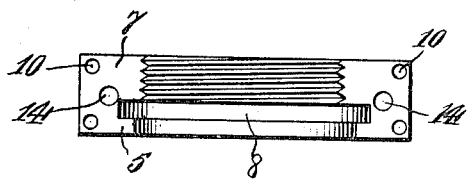

In the drawings, forming a portion of this specification and in which like numerals of reference indicate similar parts in the several views:—Figure 1 is a detail longitudinal section taken through my improved clutch collar showing the same applied to the shaft. Fig. 2 is a side elevation of the collar applied to the shaft. Fig. 3 is a transverse section taken on the line 3—3 of Fig. 2. Fig. 4 is a transverse section taken on the line 4—4 of Fig. 1. Fig. 5 is a detail transverse section through the companion members of the adjusting means. Fig. 6 is a sectional elevation showing the collar engaged in the aperture of a roll of paper. Fig. 7 is a side elevation of the clutch member. Fig. 8 is a longitudinal section through the collar. Fig. 9 is a plan view of one of the sections of the clutch member-adjusting means. Fig. 10 is a similar view of the companion section of the adjusting means.

My improved clutch collar while being primarily intended to be used upon the roll-carrying shafts of printing presses or paper making machines is intended as will be appreciated to be used upon shafts where it is desired to lock a certain removable element to the shaft.

The shaft 1 has slidably mounted thereon my improved clutch collar 2 which consists of a substantially conical member 3 whose end is adapted to be inserted in the aperture at one end of the roll A as illustrated in Fig. 6 of the drawings, the walls of the said conical member through their frictional engagement with the walls of the aperture of the roll being sufficient to cause the roll to rotate with the clutch collar. The clutch collar is formed at its outer end with an annular groove 4 which receives the flanges 5 of clutch member-adjusting means. The sections 6 and 7 of the clutch member-adjusting means are substantially identical in construction. Each section is formed with an annular groove 8 which receives the flange 9 of the groove 4. The section 7 is formed with a plurality of pairs of recesses 10 in which the tenons 11 on the section 6 fit when the sections are operatively connected with each other. The section 6 has formed therein a plurality of passages 12 in which set screws 13 are removably mounted. These screws are of such construction that they can be engaged in correspondingly formed recesses 14 in the section 7 to hold the companion sections effectively engaged with each other. The construction of the clutch member-adjusting means just described is such that the companion members when operatively connected together form a clamping ring which is mounted upon one end of the member 3 for rotation. The sections 6 and 7 are interiorly threaded and as shown in Fig. 1 of the drawings the said threaded portions are arranged directly in line with the bore 15 of the member 3. The bore 15 adjacent to one end of the member 3 has its wall flared outwardly as shown at 16.

The clutch member 17 is preferably formed of spring steel and is in form of an elongated cylindrical sleeve, one end of the said sleeve being threaded exteriorly as shown at 18 to be engaged by the threaded portions of the clutch member-adjusting means hereinbefore described. The sleeve is provided with a plurality of longitudinally extending slits 19, the portions between the slits providing spring jaws 20 which are flared outwardly so that their outer surfaces can be engaged with the flared walls of the bore 15 of the member 3. When it is desired to secure the clutch member to the shaft the sections 6 and 7 are rotated on the member 3, and incident to such rotation the engaged threaded portion 18 will be engaged by the threaded portions of the sections 6 and 7 to draw the clutch member into the bore of the member 3. In this movement of the clutch member in the member 3 the jaws 20 will be moved toward each other through their engagement with the flared walls of the bore 15. In this manner it will be readily understood that the said jaws 20 will be effectively forced into engagement with the shaft 1. The member 3 is provided with an inwardly extending lug 21 which is disposed between the walls of one of the slits 19, the purpose of the lug being to prevent rotation of the clutch member 17 in the bore of the member 3 of the collar.

I claim:—

In combination, a sleeve adapted to be mounted upon a shaft and to be moved the full length thereof and formed with a longitudinally-split and thickened end and provided with external screw threads, a collar mounted upon the sleeve and formed with an external shoulder on one end thereof, one end of the bore of said collar being enlarged to receive the thickened end of the sleeve and provided with an inwardly directed lug adapted to prevent relative movement between said sleeve and collar, a sectional ring interlocking with the external shoulder of said collar and rotatable thereon and provided with internal screw threads adapted to engage the screw threads of the sleeve and move said sleeve within said collar to force the split end of said sleeve in clutching relation to the shaft, and screws connecting the sections of the ring.

In testimony whereof I affix my signature in presence of two witnesses.

DESIRE LANGEVIN.

Witnesses:
 JAMES B. STEVENSON,
 LUCIAN W. BLANCHARD.